(12) United States Patent
Kimura

(10) Patent No.: US 11,144,804 B2
(45) Date of Patent: Oct. 12, 2021

(54) IMAGE FORMING APPARATUS

(71) Applicant: KYOCERA Document Solutions Inc., Osaka (JP)

(72) Inventor: Shinichi Kimura, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/177,312

(22) Filed: Feb. 17, 2021

(65) Prior Publication Data

US 2021/0256333 A1   Aug. 19, 2021

(30) Foreign Application Priority Data

Feb. 18, 2020   (JP) .............................. JP2020-025735

(51) Int. Cl.
*G06K 15/02*   (2006.01)

(52) U.S. Cl.
CPC ..... *G06K 15/1885* (2013.01); *G06K 15/1809* (2013.01); *G06K 15/1822* (2013.01)

(58) Field of Classification Search
CPC ........... G06K 15/1885; G06K 15/1809; G06K 15/1822; G06F 3/1208; G06F 3/1253; G06F 3/1256
USPC ....................................... 358/1.2, 1.15, 1.18
See application file for complete search history.

(56) References Cited

U.S. PATENT DOCUMENTS

2010/0134820 A1*   6/2010   Nakamura ............. G06Q 30/06
                                                                  358/1.14
2018/0338064 A1*  11/2018   Nagahama ........... H04N 1/3873

FOREIGN PATENT DOCUMENTS

JP          2002-010059        1/2002

* cited by examiner

*Primary Examiner* — Kent Yip
(74) *Attorney, Agent, or Firm* — Lex IP Meister, PLLC

(57) ABSTRACT

The image forming apparatus includes a printing device, an image reading device, a job management unit, and a document detection processing unit. The image reading device reads an image in a predetermined range in which a document can be arranged, as a read image. The job management unit acquires a front side image and a back side image of a card document, and prints the front side image and the back side image on both sides of a print sheet using the printing device. The document detection processing unit specifies a document image area of the front side image and a document image area of the back side image. The job management unit selects a larger size as the common image area size when a difference in size between the document image areas of the front side and the back side exceeds a predetermined threshold.

5 Claims, 4 Drawing Sheets

IMAGE FORMING APPARATUS

INCORPORATION BY REFERENCE

This application is based upon and claims the benefit of priority from the corresponding Japanese Patent Application No. 2020-025735 filed on Feb. 18, 2020, the entire contents of which are incorporated herein by reference.

BACKGROUND

The present disclosure relates to an image forming apparatus.

An image processing apparatus detects a document edge in a read image based on a density difference, specifies an area of the document image in the read image based on the detected document edge, and extracts an image of the area as a document image.

SUMMARY

The image forming apparatus includes a printing device, an image reading device, a job management unit, and a document detection processing unit. The image reading device reads an image in a predetermined range in which a document can be arranged as a read image. The job management unit acquires a front side image and a back side image of a card document, and prints the front side image and the back side image on both sides of a print sheet using the printing device. The document detection processing unit specifies a document image area of the front side image and a document image area of the back side image. The job management unit selects a larger size as the common image area size when a difference in size between the document image areas of the front side and the back side exceeds a predetermined threshold. Then, the front side image and the back side image are extracted with the common image region size, and the extracted front side image and the extracted back side image are printed at the same magnification ratio at predetermined positions on both sides of the print sheet.

DETAILED DESCRIPTION

Embodiments of the present disclosure will now be described with reference to the drawings.

Figure 1:
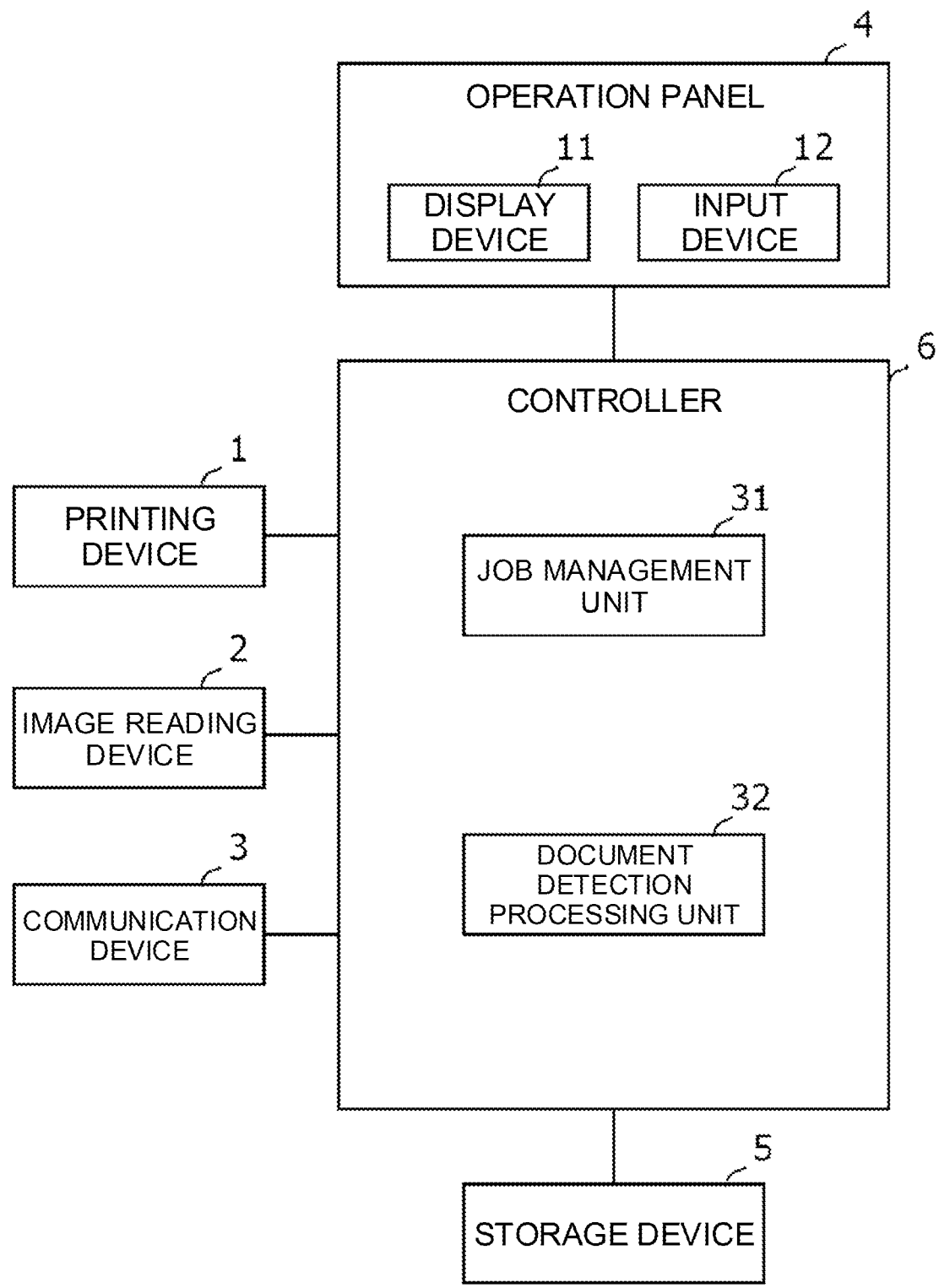
FIG. 1 is a block diagram showing a configuration of an image forming apparatus according to an embodiment of the present disclosure.

FIG. 1 is a block diagram showing a configuration of an image forming apparatus according to an embodiment of the present disclosure. The image forming apparatus shown in FIG. 1 is a multifunction peripheral, but may be a copying machine or the like.

The image forming apparatus shown in FIG. 1 includes a printing device 1, an image reading device 2, a communication device 3, an operation panel 4, a storage device 5, and a controller 6.

The printing device 1 is an internal device for printing an original image on a print sheet (print sheet or the like). The printing device 1 has a duplex printing function.

The image reading device 2 is an internal device for reading a document image from a document. Specifically, an image (hereinafter referred to as a read image) in a predetermined range in which a document can be placed (for example, a predetermined range of a platen glass on which the document is placed) is optically read, and image data representing the read image is output.

The communication device 3 is an internal device that performs data communication with an external device via a network or the like.

Figure 2:
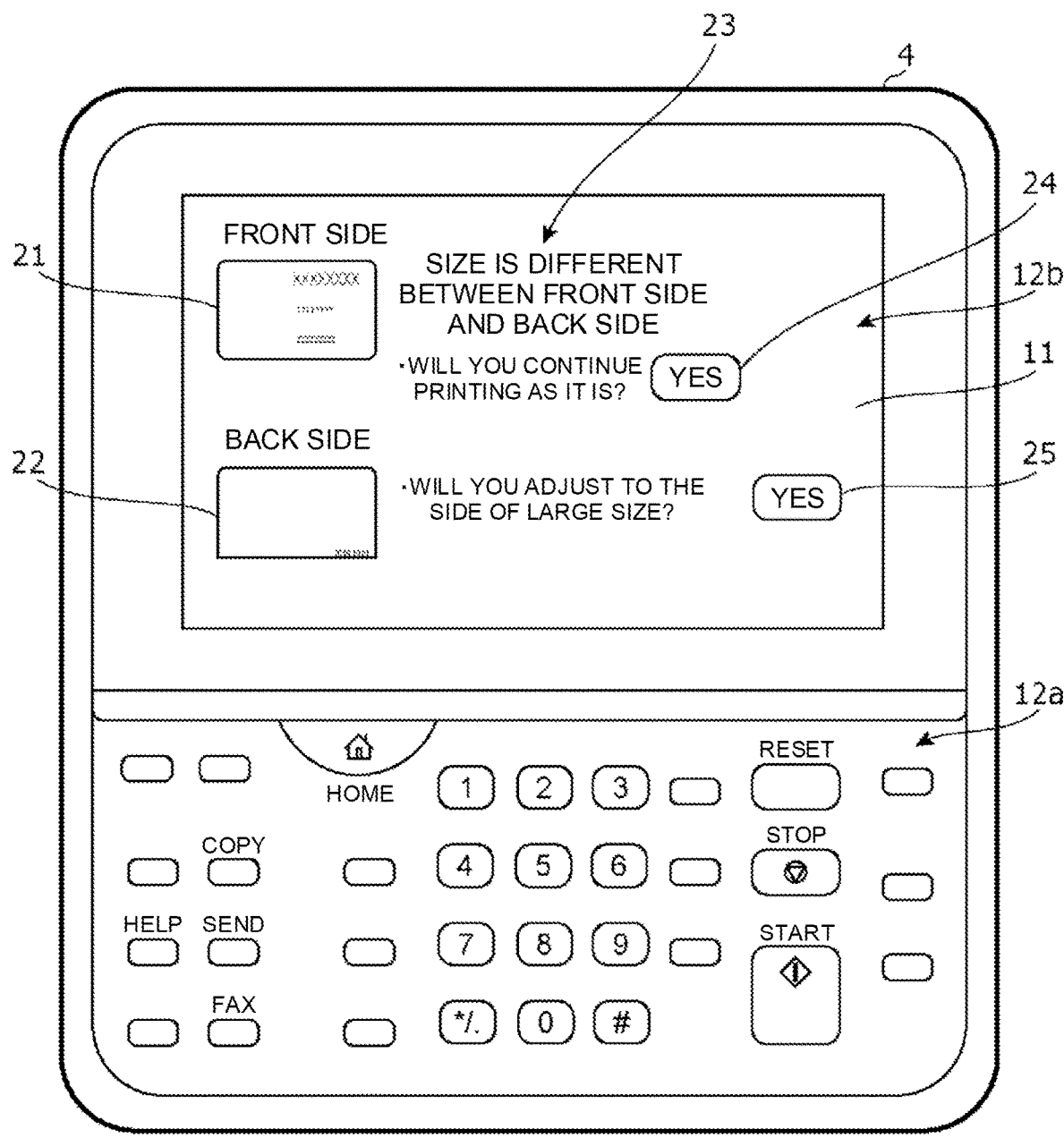
FIG. 2 is a view showing an example of the operation panel 4 in FIG. 1.

The operation panel 4 is a user interface installed in the housing of the image forming apparatus, and includes a display device 11 and an input device 12. FIG. 2 is a view showing an example of the operation panel 4 in FIG. 1. The display device 11 is a device such as a liquid crystal display that displays a screen including various kinds of information to a user. The input device 12 is a device such as a hard key 12a or a touch panel 12b for a soft key for receiving a user operation for inputting a command to the image forming apparatus.

The storage device 5 is a nonvolatile storage device that stores programs, data, and the like.

The controller 6 includes a microprocessor for executing a program, an ASIC (Application Specific Integrated Circuit), and the like, and controls the internal apparatus described above and executes various processes by the microprocessor, the ASIC, and the like. Here, the controller 6 operates as a job management unit 31 and a document detection processing unit 32.

The job management unit 31 executes a job using the printing device 1, the image reading device 2, or the like in accordance with a job request based on a user operation to the operation panel 4, a job request received from a host apparatus (not shown) by the communication device 3, or the like.

In particular, the job management unit 31 executes a job of duplex copy of a card document 101 (a small plastic card having a hard plate shape such as an ID card). In the duplex copy job, the job management unit 31 acquires the first read image including an image of a front side of the card document and the second read image including an image of a back side of the card document by using the image reading device 2, and prints the front side image in the first read image and the back side image in the second read image on both sides of the print sheet by using the printing device 1.

Figure 3:
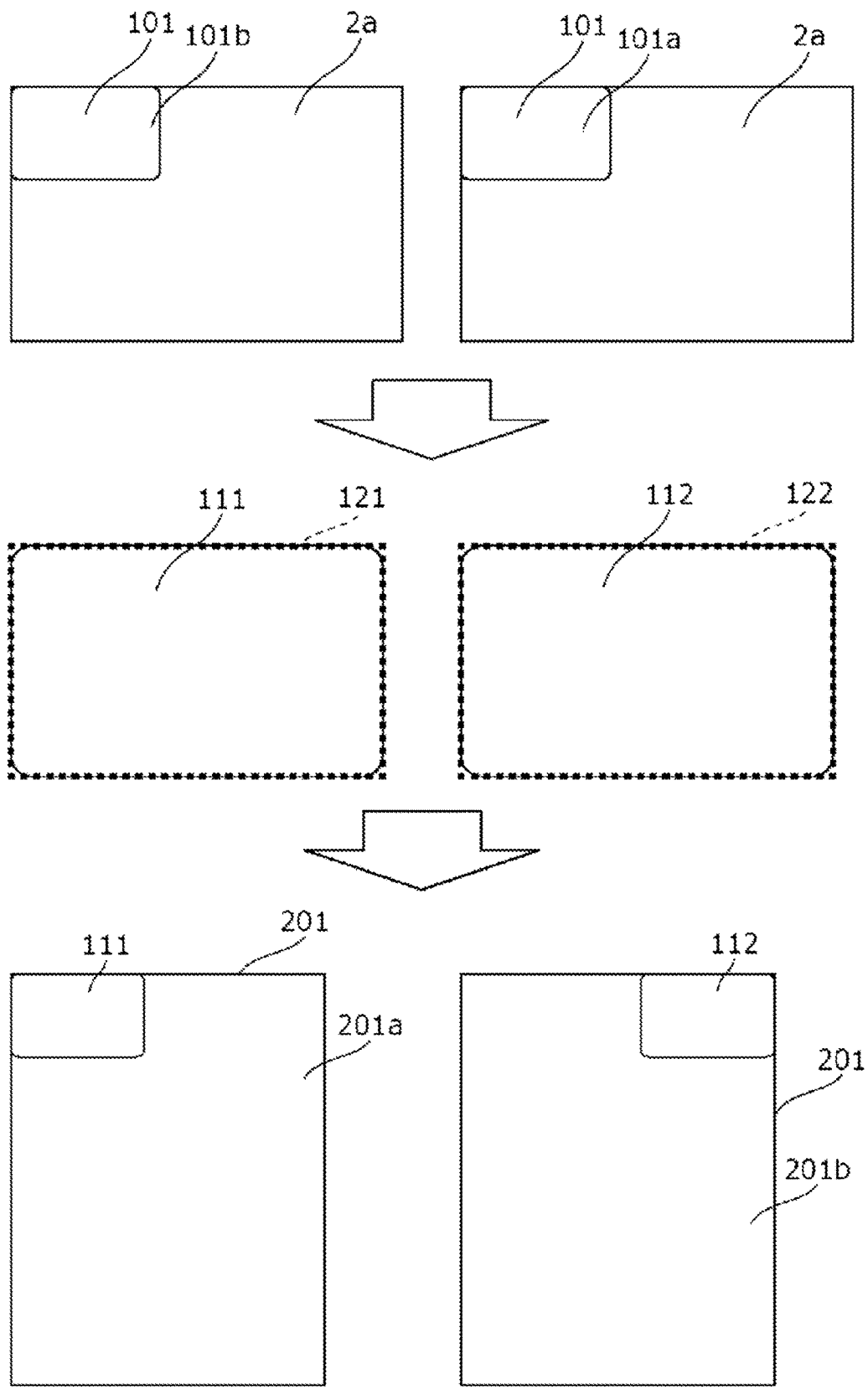
FIG. 3 is a view for explaining duplex copy of a card document in the image forming apparatus shown in FIG. 1.

FIG. 3 is a view for explaining duplex copy of the card document in the image forming apparatus shown in FIG. 1. For example, as shown in FIG. 3, first, the card document 101 is placed on the platen glass 2a with the front side 101a facing the platen glass 2a, and the first image reading is executed. Thus, the first read image is obtained, and thereafter, the card document 101 is placed on the platen glass 2a with the back side 101b facing the platen glass 2a, and the second image reading is executed. Thus, the second read image is obtained.

The document detection processing unit 32 specifies a document image area of the front side image in the first read image and a document image area of the back side image in the second read image. For example, the document detection processing unit 32 detects an edge in the above-described read image and specifies an area surrounded by the edge (or a circumscribed rectangular area thereof) as a document image area.

For example, as shown in FIG. 3, a document image area 121 corresponding to a front side image 111 is specified, and a document image area 122 corresponding to a back side image 112 is specified. If the difference in size between the document image area 121 and the document image area 122 (for example, the larger difference in height and width or the difference in area) does not exceed the predetermined threshold, the image of the document image area 121 in the read image is extracted as the front side image 111, and the image of the document image area 122 in the read image is extracted as the back side image 112.

Then, as shown in FIG. 3, for example, the extracted front side image 111 is printed at a predetermined position on a front side 201a of a print sheet 201 (the upper left corner in FIG. 3), and the extracted back side image 112 is printed at a position on a back side 201b corresponding to the predetermined position (that is, a position on the back side of the position where the front side image 111 was printed, and the upper right corner in FIG. 3).

When the difference between the size of the document image area 121 of the front side image 111 and the size of the document image area 122 of the back side image 112 exceeds a predetermined threshold, the job management unit 31(a) as the image area optimization processing, (a1) selects the size of the larger of the document image area 121 of the front side image 111 and the document image area 122 of the back side image 112 as the common image area size, (a2) extracts the front side image 111 with the common image area size from the first read image, and extracts the back side image 112 with the common image area size from the second read image, and (b) prints the extracted front side image 111 and the extracted back side image 112 at predetermined positions on each of the front side 201a and the back side 201b of the print sheet 201 at the same magnification ratio (in this case, the magnification ratio is 1, but it may be an enlargement ratio or a reduction ratio) using the printing device 1.

The predetermined threshold may be a fixed value or may be settable by a user.

Specifically, for a side (front side or back side) in which the size of the original document image area is smaller than the common image area size, the job management unit 31 fixes a predetermined vertex (or center) of the document image area (rectangular area), enlarges the document image area to the common image area size, and extracts the front side image 111 or the back side image 112 from the enlarged document image area.

When the difference between the size of the document image area 121 of the front side image 111 and the size of the document image area 122 of the back side image 112 does not exceed the predetermined threshold, as described above, the job management unit 31(a) extracts the front side image 111 from the first read image at the size of the document image area 121 of the front side image 111, extracts the back side image 112 from the second read image at the size of the document image area 122 of the back side image 112, and (c) prints, using the printing device 1, the extracted front side image 111 and the extracted back side image 112 at predetermined positions of each of the front side 201a and the back side 201b of the print sheet 201 at the same magnification ratio.

Further, in this embodiment, when the difference between the size of the document image area 121 of the front side image 111 and the size of the document image area 122 of the back side image 112 exceeds a predetermined threshold, (a) the job management unit 31 displays the front side image 21 (the image extracted from the document image area 121), the back side image 22 (the image extracted from the document image area 122), and a message 23 (guidance or the like) indicating a plurality of processing options on the display device 11, as shown in FIG. 2 for example, and (b) the input device 12 detects a user operation (for example, a pressing operation of soft keys 24, 25) for selecting one of the plurality of processing options, and executes processing corresponding to the selected option indicated by the detected user operation.

For example, as shown in FIG. 2, the above-described options include (a) a process of performing the above-described image area optimization processing and performing duplex printing of the front side image and the back side image as described above, and (b) a process of performing duplex printing of the front side image and the back side image as described above without performing the image area optimization processing.

Here, the above-described option may further include (c) a process of reacquiring the first read image including the front side image of the card document and the second read image including the back side image of the card document by using the image reading device 2. Thus, the front side image and the back side image are extracted from the reacquired first read image and the reacquired second read image, and the displayed front side image and the displayed back side image are updated.

Figure 4:
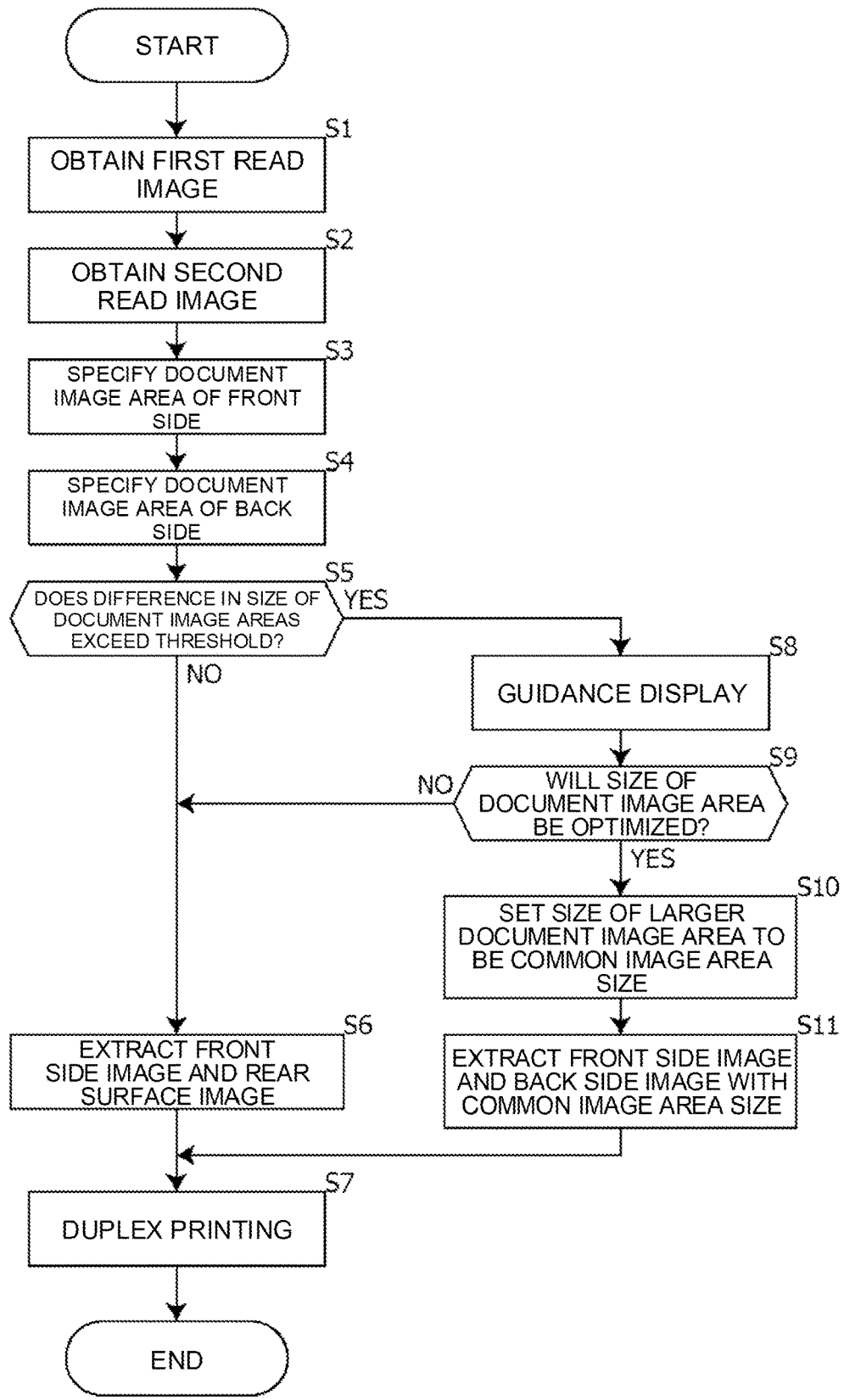
FIG. 4 is a flowchart for explaining the operation of the image forming apparatus shown in FIG. 1.

Next, the operation of the image forming apparatus will be described. FIG. 4 is a flowchart for explaining the operation of the image forming apparatus shown in FIG. 1.

When the job management unit 31 receives a job request for duplex copy of the card document 101, the job management unit 31 starts execution of the job. First, when the input device 12 detects a predetermined operation to be performed after the user places the card document 101 on the platen glass 2a of the image reading device 2, the job management unit 31 causes the image reading device 2 to perform image reading and acquires a first read image (step S1).

Next, when the input device 12 detects a predetermined operation to be performed after the user inverts the card document 101 and places it on the platen glass 2a of the image reading device 2, the job management unit 31 causes the image reading device 2 to perform image reading and acquires a second read image (step S2).

When the first and second read images are acquired, the document detection processing unit 32 specifies the document image area 121 of the front side image in the first read image and the document image area 122 of the back side image in the second read image (steps S3 and S4).

The job management unit 31 derives a difference between the sizes of the specified document image areas 121 and 122, and determines whether or not the difference exceeds a predetermined threshold (step S5).

If it is determined that the difference in the size of the specified document image areas 121 and 122 does not exceed the predetermined threshold, the job management unit 31 extracts the front side image 111 and the back side image 112 from the document image area 121 and 122 in the first read image (step S6), and prints the extracted front side image 111 and the back side image 112 on both sides as described above (step S7).

On the other hand, when it is determined that the above-described size difference exceeds the predetermined threshold, the job management unit 31 displays a guidance as shown in FIG. 2, for example, on the display device 11 (step S8), and when the input device 12 detects a user operation for selecting any of displayed processing options, it is determined whether or not the size of the document image area is to be optimized based on the user operation (step S9).

The job management unit 31 determines that the size of the document image area is to be optimized when a user operation for permitting the size of the document image area to be optimized is performed (for example, when the soft key 25 in FIG. 2 is pressed), and determines that the size of the document image area is not to be optimized when a user operation for rejecting the size of the document image area is performed (for example, when the soft key 24 in FIG. 2 is pressed).

When it is determined that the size of the document image area is to be optimized, the job management unit 31 sets the size of the document image area having the larger size among the two document image areas 121 and 122 as the common image area size (step S10), extracts both the front side image 111 and the back side image 112 with the common image area size (step S11), and prints the extracted front side image 111 and back side image 112 on both sides as described above (step S7). Thus, even if either the size of the front side image or the size of the back side image is not appropriately detected in the read image, the front side image and the back side image are appropriately extracted in the common image area size, thereby preventing such a situation in which one of the front side image and the back side image is printed in a state where a part thereof is missing.

On the other hand, when it is determined that the size of the document image area is not to be optimized, the job management unit 31 extracts the front side image 111 and the back side image 112 from the document image area 121 and 122 in the first read image (step S6), and prints the extracted front side image 111 and the back side image 112 on both sides as described above (step S7).

As described above, according to the embodiment, the job management unit 31 acquires the first read image including the front side image of the card document and the second read image including the back side image of the card document using the image reading device 2, and prints the front side image in the first read image and the back side image in the second read image on both sides of the print sheet using the printing device 1, thereby executing the job of duplex copy of the card document. The document detection processing unit 32 specifies the document image area of the front side image in the first read image and the document image area of the back side image in the second read image. When a difference between a size of a document image area of the front side image and a size of a document image area of the back side image exceeds a predetermined threshold, the job management unit 31(*a*) as image area optimization processing, (a1) selects a larger size of a document image area of the front side image and a document image area of the back side image as a common image area size, (a2) extracts the front side image from the first read image with the common image area size and extracting the back side image from the second read image with the common image area size, and (b) prints the extracted front side image and the extracted back side image at the same magnification ratio at predetermined positions on the front side and the back side of the print sheet using the printing device 1.

As a result, even the document image area of either the front side or the back side of the card document is not properly detected, a duplicate of the card document is properly generated by the duplex copy.

Various changes and modifications to the above-described embodiments will be apparent to those skilled in the art. Such changes and modifications may be made without departing from the spirit and scope of the subject matter and without diminishing its intended advantages, i. e., such changes and modifications are intended to be included in the appended claims.

For example, in the above-described embodiment, the user places the card document 101 on the platen glass 2*a* twice and performs image reading twice (i. e., manual double-sided image reading), but if the image reading device 2 is equipped with an apparatus capable of automatically conveying the card document, such double sided image reading may be performed automatically.

What is claimed is:

1. An image forming apparatus comprising
a printing device;
an image reading device that optically reads an image in a predetermined range in which a document can be placed, as a read image;
a job management unit that acquires a first read image including a front side image of a card document and a second read image including a back side image of the card document by using the image reading device, and print the front side image in the first read image and the back side image in the second read image on both sides of a print sheet by using the printing device, thereby executing a job of duplex copy of the card document; and
a document detection processing unit that specifies a document image area of the front side image in the first read image and a document image area of the back side image in the second read image,
wherein when a difference between a size of the document image area of the front side image and a size of the document image area of the back side image exceeds a predetermined threshold, the job management unit (a) as image area optimization processing, (a1) selects a larger size of the document image area of the front side image and the document image area of the back side image as a common image area size, (a2) extracts the front side image from the first read image with the common image area size and extracting the back side image from the second read image with the common image area size, and (b) prints the extracted front side image and the extracted back side image at the same magnification ratio at predetermined positions on the front side and the back side of the print sheet using the printing device.

2. The image forming apparatus according to claim 1,
wherein when the difference between the size of the document image area of the front side image and the size of the document image area of the back side image does not exceed the predetermined threshold, the job management unit (a) extracts an image in the document image area of the front side image as the front side image from the first read image and extracts an image in the document image area of the back side image as the back side image from the second read image, and (b) prints the extracted front side image and the extracted back side image at the same magnification ratio at predetermined positions on the front side and the back side of the print sheet using the printing device.

3. The image forming apparatus according to claim 1, further comprising:
a display device; and
an input device,
wherein when the difference between the size of the document image area of the front side image and the size of the document image area of the back side image exceeds the predetermined threshold, the job management unit (a) displays the front side image, the back side image, and a message indicating plurality of processing options on the display device, and (b) detects a user operation of selecting any one of the plurality of processing options on the input device and executes a process corresponding to the option indicated by the detected user operation, wherein the options include (a) executing the image area optimization processing and printing the extracted front side image and the extracted back side image at the same magnification at predetermined positions on the front side and the back side of the print sheet by using the printing device, and (b) printing the extracted front side image and the extracted back side image at the same magnification ratio at predetermined positions on the front side and the back side of the print sheet by using the printing device without executing the image area optimization processing.

4. The image forming apparatus according to claim 3, wherein the options further include (c) reacquiring a first read image including the front side image of the card document and a second read image including the back side image of the card document using the image reading device.

5. The image forming apparatus according to claim 1, wherein the predetermined threshold can be set by a user.

* * * * *